UNITED STATES PATENT OFFICE.

CASPER KALTHOFF, OF BUFFALO, NEW YORK, ASSIGNOR OF TWO-THIRDS OF HIS RIGHT TO GUSTAV FLEISCHMANN, OF SAME PLACE.

PROCESS FOR RECTIFYING SPIRITS.

SPECIFICATION forming part of Letters Patent No. 231,328, dated August 17, 1880.

Application filed March 27, 1880. (No model.)

*To all whom it may concern:*

Be it known that I, CASPER KALTHOFF, of the city of Buffalo, in the county of Erie and State of New York, have invented a new and useful Improvement in Processes for Rectifying Spirits, of which the following is a specification.

The object of my invention is to simplify the process of rectifying alcoholic spirits; and it consists in mixing with the spirits a small quantity of nitrate of silver previous to redistilling the same, as will be hereinafter fully set forth.

In carrying out my improved process I dissolve about four ounces of nitrate of silver in about four gallons of warm water, and to this solution I preferably add about ten pounds of carbonate of lime. In order to dissolve these substances more expeditiously I preferably add about two gallons of high-wines or high-proof spirits to the water in which it is intended to dissolve the nitrate of silver.

The quantity of solution produced in the above-described manner will be found sufficient for the rectification of about fifteen hundred gallons of high-wines.

The high-wines to be rectified are first reduced below proof in the usual manner, and then mixed with the above-described solution in about the proportion hereinbefore stated.

The reduced high-wines mixed with the above-described solution are then introduced into the still and are redistilled in the usual manner.

The nitrate of silver effects a complete separation of the deleterious matters contained in the spirits from the latter, which are distilled over in a pure state, while the nitrate of silver and the precipitated deleterious matters are drawn off with the low-wines and fusel-oil after the process of redistillation has been finished.

By my improved process of rectification the expensive charcoal filters and the machinery employed in forcing the spirits through the same are entirely dispensed with, the time, fuel, and labor required in charcoal filtration are saved, and the attendant loss by evaporation is entirely avoided.

I do not intend to limit myself to the precise proportions of ingredients hereinbefore given, which proportions I have, however, found in practice to give satisfactory results.

I claim as my invention—

The process of rectifying alcoholic spirits, consisting, essentially, in mixing with the spirits a small quantity of nitrate of silver and then redistilling the same, substantially as set forth.

CASPER KALTHOFF.

Witnesses:
GUSTAV FLEISCHMANN,
EDWARD WILHELM.